Figure 1:
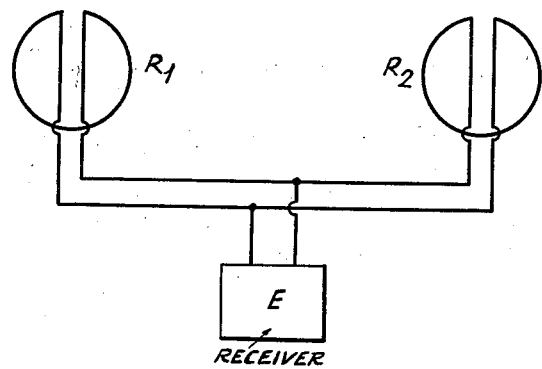

Dec. 24, 1940.  R. KÜMMICH ET AL  2,226,379
DIRECTION FINDER
Filed Feb. 4, 1938

INVENTORS
RICHARD KÜMMIC
ALBRECHT GOTH
BY
ATTORNEY

Patented Dec. 24, 1940

2,226,379

UNITED STATES PATENT OFFICE 2,226,379

DIRECTION FINDER

Richard Kümmich and Albrecht Gothe, Berlin, Germany, assignors to Telefunken Gesellschaft für Drahtlose Telegraphie m. b. H., Berlin, Germany, a corporation of Germany Application February 4, 1938, Serial No. 188,623
In Germany June 20, 1936

2 Claims. (Cl. 250—11)

The present invention is concerned with a loop type direction finder for short waves.

With a view to minimizing the night effect in connection with direction-finding work it has been suggested in the prior art to use two parallel frames or loops mounted so as to be revoluble about their vertical axis of symmetry, and which are connected with the receiver in a differential circuit organization. When such an arrangement is utilized for short waves, a rather imprecise minimum or zero-signal point results in the taking of bearings with the use of standard or plain loops or frames.

According to the present invention, therefore, the two loops are so designed that their minimum signal-strength points are sharp and precise. This may be accomplished, for instance, as known in the art by the use of auxiliary aerials which present capacitive symmetry in reference to the ground to an especially high degree. This may be insured, for example, by connecting the loop leads with the top end of the loop rather than, as is customarily done, at the bottom end thereof. The result is that, inside regions or territory free from reflection, the direction finder results in sharp minima without the provision of means designed to cure night effects.

In distinction from what is true in a plain loop a twin-loop direction finder has four minimum or zero-signal points. Two of these minimum signal strength points arise when the planes of the frames are at right angles to the direction of incidence of the waves, and the other two points result when the frames coincide with the direction of incidence. Now, these minimum signal points are utilized for taking bearings. To discriminate between the two, as well known in the prior art, recourse is had to ways and means adapted to couple the frames or loops in the same sense and in opposition to the receiver. If the two antennas are in the direction of incidence of the incoming waves, then, with coupling in opposition, a point will be found where the signal is of minimum value, while with coupling in the same sense, great acoustic intensity will be received. But if both loops are placed in a position at right angles to the sense of incidence, then the signal volume will not be altered appreciably as a result of reversal of polarity of one of the loops.

In order to discern the accurate minimum signal strength points recourse may be had also to an auxiliary or accessory loop located upon the joint axis of rotation in a position parallel to the direction-finding loop. By the aid of this loop it is possible to render correct minimum or zero points more accurate and definite, while pseudo points can not be corrected in the same way.

When the plane of the auxiliary loop or frame is disposed at right angles to the planes of the direction-finding loops, then the auxiliary loop may also be used for ascertaining the sense of the signal in that one of the minimum signal points spreads, while the other one is but little affected. For sense-finding, as fundamentally well known in the earlier art, it is necessary to turn the phase of the current in the auxiliary loop an angle of roughly 90 degrees. By a reversal of the polarity of the connections or terminals it is feasible to speedily determine which of the two minimum signal points is caused to flatten or spread and which stays practically unaffected.

Figure 2:
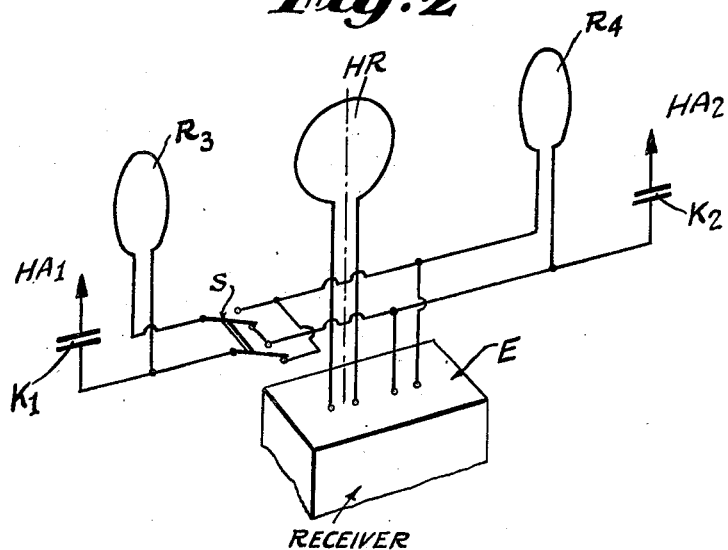

In the accompanying drawing are shown, by way of example, in Figures 1 and 2, two embodiments of the direction finder of the invention. As shown in Fig. 1 the two loops or frames $R_1$ and $R_2$ are connected to the receiver E. The leads brought to the turns of the frame or loop proper are passed through the loop plane, and they are connected with the loops at the upper ends of the frames. As shown in Fig. 2, the two frames $R_3$ and $R_4$ are connected with the receiver E, and for the purpose of sharper bearings, an auxiliary antenna $HA_1$ and $HA_2$, respectively, is associated with each of the two loops. These auxiliary antennae are in coupling relation by suitable means indicated at $K_1$ and $K_2$. For sense-finding, an auxiliary loop HR is mounted which is arranged at the pivoting or axial point of the entire direction-finder assembly.

Since in the reception of short waves several rays or beams will generally reach the receiver simultaneously, it is advisable to figure with the chance of the direction of incidence not being quite constant, with the consequence that a perfectly sharp and stable minimum signal point will be attainable. Determination of direction in such case is effected by constant turning of the direction finder to like amplitudes upon both sides of the minimum or zero volume point. Instead of that recourse may be had also to flicker or shimmer type of direction finding. This is preferably done by the aid of a non-directional antenna which is in reversible-polarity coupling relationship with the receiver. As a consequence, the minimum point or zero may be shifted in one direction or the other. In other words, all that is necessary is to slowly turn the direction-finding apparatus until the same incoming signal strength is obtained in both positions of the aerial.

We claim:

1. A direction-finding arrangement comprising a pair of parallel loop antennae mounted for revolution around the vertical axis of symmetry of the pair, said parallel loops being connected in parallel, an auxiliary loop antenna so mounted for revolution on said axis that it may be adjusted parallel or at right angles to said parallel loops and a receiver having its input connected to said pair of antennae and said auxiliary loop antenna.

2. A direction-finding arrangement comprising a pair of loop antennae being disposed in parallel vertical planes and mounted for revolution around the vertical axis of symmetry of the pair and connected in parallel, an auxiliary loop antenna mounted for revolution upon said axis, a receiver having its input coupled to said pair of loop antennae and said auxiliary loop antenna, and means for reversing the sense of the coupling of said auxiliary loop antenna to said receiver with respect to that of said parallel loop antennae.

ALBRECHT GOTHE.
RICHARD KÜMMICH.